(12) United States Patent
Kenney et al.

(10) Patent No.: US 9,160,595 B2
(45) Date of Patent: Oct. 13, 2015

(54) TECHNIQUES TO MANAGE DWELL TIMES FOR PILOT ROTATION

(71) Applicant: Intel Corporation, Santa Clara, CA (US)

(72) Inventors: Thomas J. Kenney, Portland, OR (US); Eldad Perahia, Portland, OR (US); Shahrnaz Azizi, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/325,936

(22) Filed: Jul. 8, 2014

(65) Prior Publication Data

US 2014/0321564 A1    Oct. 30, 2014

Related U.S. Application Data

(63) Continuation of application No. 13/725,549, filed on Dec. 21, 2012, which is a continuation-in-part of application No. 13/628,613, filed on Sep. 27, 2012.

(60) Provisional application No. 61/603,449, filed on Feb. 27, 2012.

(51) Int. Cl.
*H04L 27/26* (2006.01)
*H04L 5/00* (2006.01)
(Continued)

(52) U.S. Cl.
CPC .......... *H04L 27/2626* (2013.01); *H04L 1/0002* (2013.01); *H04L 1/0009* (2013.01);
(Continued)

(58) Field of Classification Search
CPC . H04L 5/0048; H04L 5/0007; H04L 27/2675; H04L 27/2647
USPC .......... 375/232, 260, 346, 340; 370/252, 329, 370/208
See application file for complete search history.

(56) References Cited

U.S. PATENT DOCUMENTS 7,522,514 B2    4/2009    Tzannes et al.
8,649,447 B2    2/2014    Mohebbi
(Continued)

FOREIGN PATENT DOCUMENTS

EP    0725495    8/1996

OTHER PUBLICATIONS

International Search Report and Written Opinion for PCT Patent Application No. PCT/US2013/025943, mailed on Jun. 21, 2013, 11 pages.
(Continued)

*Primary Examiner* — Jamal Javaid
(74) *Attorney, Agent, or Firm* — Shichrur & Co.

(57) ABSTRACT

Techniques to manage dwell times for pilot rotation are described. An apparatus may comprise a memory configured to store a data structure with a set of modulation and coding schemes (MCS) available to an orthogonal frequency division multiplexing (OFDM) system, each MCS having an associated pilot dwell time. The apparatus may further comprise a processor circuit coupled to the memory, the processor circuit configured to identify a MCS to communicate a packet using multiple subcarriers of the OFDM system, and retrieve a pilot dwell time associated with the MCS from the memory, the pilot dwell time to indicate when to shift a pilot tone between subcarriers of the multiple subcarriers during communication of the packet. Other embodiments are described and claimed.

19 Claims, 14 Drawing Sheets

(51) Int. Cl.
*H04W 72/04* (2009.01)
*H04L 25/02* (2006.01)
*H04L 25/03* (2006.01)
*H04L 1/00* (2006.01)
*H04W 84/12* (2009.01)

(52) U.S. Cl.
CPC ............... *H04L 5/003* (2013.01); *H04L 5/005* (2013.01); *H04L 5/0048* (2013.01); *H04L 25/025* (2013.01); *H04L 25/0224* (2013.01); *H04L 25/0228* (2013.01); *H04L 25/03019* (2013.01); *H04W 72/04* (2013.01); *H04L 2025/03617* (2013.01); *H04W 84/12* (2013.01)

(56) References Cited

U.S. PATENT DOCUMENTS

| | | | |
|---|---|---|---|
| 2003/0053410 | A1 | 3/2003 | Williams et al. |
| 2003/0103445 | A1 | 6/2003 | Steer et al. |
| 2003/0128656 | A1* | 7/2003 | Scarpa ............ 370/203 |
| 2005/0265218 | A1 | 12/2005 | Molisch et al. |
| 2006/0172704 | A1 | 8/2006 | Nishio et al. |
| 2007/0147520 | A1* | 6/2007 | Li et al. ............ 375/260 |
| 2007/0165726 | A1 | 7/2007 | Ding et al. |
| 2007/0189406 | A1 | 8/2007 | Kim et al. |
| 2008/0095226 | A1 | 4/2008 | Bar-Ness et al. |
| 2008/0165672 | A1* | 7/2008 | Ku et al. ............ 370/208 |
| 2008/0232239 | A1 | 9/2008 | Mujtaba et al. |
| 2008/0273510 | A1 | 11/2008 | Mudulodu et al. |
| 2009/0060075 | A1* | 3/2009 | Mohebbi ............ 375/260 |
| 2009/0257411 | A1 | 10/2009 | Shitara |
| 2010/0034311 | A1 | 2/2010 | Hasegawa |
| 2010/0054194 | A1 | 3/2010 | Chauncey et al. |
| 2010/0329394 | A1 | 12/2010 | Bae et al. |
| 2011/0116516 | A1 | 5/2011 | Hwang et al. |
| 2011/0216808 | A1 | 9/2011 | Tong et al. |
| 2012/0020427 | A1 | 1/2012 | Butussi et al. |
| 2012/0082252 | A1 | 4/2012 | Annavajjala et al. |
| 2013/0070605 | A1 | 3/2013 | Ghosh et al. |

OTHER PUBLICATIONS

International Search Report and Written Opinion for PCT Patent Application No. PCT/US2013/027782, mailed on Jun. 14, 2013, 9 pages.
Sofer, et al., "Deployment Scenarios with reuse 1 (utilizing FUSC and PUSC concept)", IEEE 802.22-06/0109r2, Jul. 9, 2006, 16 pages.
Office Action for U.S. Appl. No. 13/628,613, mailed on Jul. 15, 2014, 13 pages.
Final Office Action for U.S. Appl. No. 13/725,549, mailed on Feb. 24, 2015, 22 pages.
International Preliminary Report on Patentability and Written Opinion for PCT Application No. PCT/US2013/025943, mailed on Sep. 12, 2014, 8 pages.
International Preliminary Report on Patentability and Written Opinion for PCT Application No. PCT/US2013/027782, mailed on Sep. 12, 2014, 6 pages.
Office Action for U.S. Appl. No. 13/628,613, mailed on Dec. 12, 2014, 27 pages.
Office Action for U.S. Appl. No. 13/725,549, mailed on Sep. 19, 2014, 19 pages.
Extended Search Report for European Patent Application No. 13755889.6, mailed on Feb. 27, 2015, 6 pages.
Final Office Action for U.S. Appl. No. 13/628,613, mailed on Apr. 2, 2015, 27 pages.

* cited by examiner

*600*

| MCS | Modulation | CodeRate | N |
|---|---|---|---|
| 0 ( with 2x Rep) | BPSK | ½ | 8 |
| 0 | BPSK | ½ | 4 |
| 1 | QPSK | ½ | 3 |
| 2 | QPSK | ¾ | 3 |
| 3 | 16-QAM | ½ | 2 |
| 4 | 16-QAM | ¾ | 2 |
| 5 | 64-QAM | 2/3 | 2 |
| 6 | 64-QAM | ¾ | 2 |
| 7 | 64-QAM | 5/6 | 2 |
| 8 | 256-QAM | ¾ | 1 |
| 9 | 256-QAM | 5/6 | 1 |

*FIG. 6*

TECHNIQUES TO MANAGE DWELL TIMES FOR PILOT ROTATION

RELATED APPLICATION

This application is a Continuation-In-Part (CIP) of, and claims priority to, commonly owned U.S. patent application Ser. No. 13/628,613 entitled "IMPROVED CHANNEL ESTIMATION AND TRACKING" filed Sep. 27, 2012, the disclosure of which is incorporated herein by reference in its entirety.

BACKGROUND

Sensor networks have numerous applications, such as security, industrial monitoring, military reconnaissance, and biomedical monitoring. In many such applications, it is either inconvenient or impossible to connect the sensors by wire or cable; a wireless network is preferable. Sensor networks may be implemented indoors or outdoors. Seismic sensors, for example, may be used to detect intrusion or movement of vehicles, personnel, or large earth masses.

The detection of vehicles and personnel is more difficult than detecting large signals, as from earthquakes or movement of earth masses. The reliable detection or tracking over large areas thus requires very large numbers of sensitive detectors, spaced closely. Although placing sensor nodes in the environment is relatively easy, and configuring them in a network is manageable, a problem faced by sensor networks is that determining where they are in geographic coordinate locations is difficult and expensive. A wireless network of numerous sensitive, low cost, low-powered sensor stations is more desirable. However, the resulting overhead for channel estimation is usually prohibitive in a wireless sensor network.

A wireless communications standard is being developed by the Institute of Electrical and Electronics Engineers (IEEE) 802.11ah (11ah) task group. IEEE 802.11ah (11ah) is a new technology evolution for WiFi and is in the standards development phase; very low data rate operation is being enabled. In IEEE 802.11a/g, 20 MHz channel widths were defined and in IEEE 802.11n 40 MHz was added and then in IEEE 802.11ac both 80 and 160 MHz. In the past the evolution of WiFi has been to increase data rate, but IEEE 802.11ah (11ah) actually targets comparatively lower rate services.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6 is an exemplary pilot dwell time table in accordance with one embodiment;

DETAILED DESCRIPTION

Figure 1A:
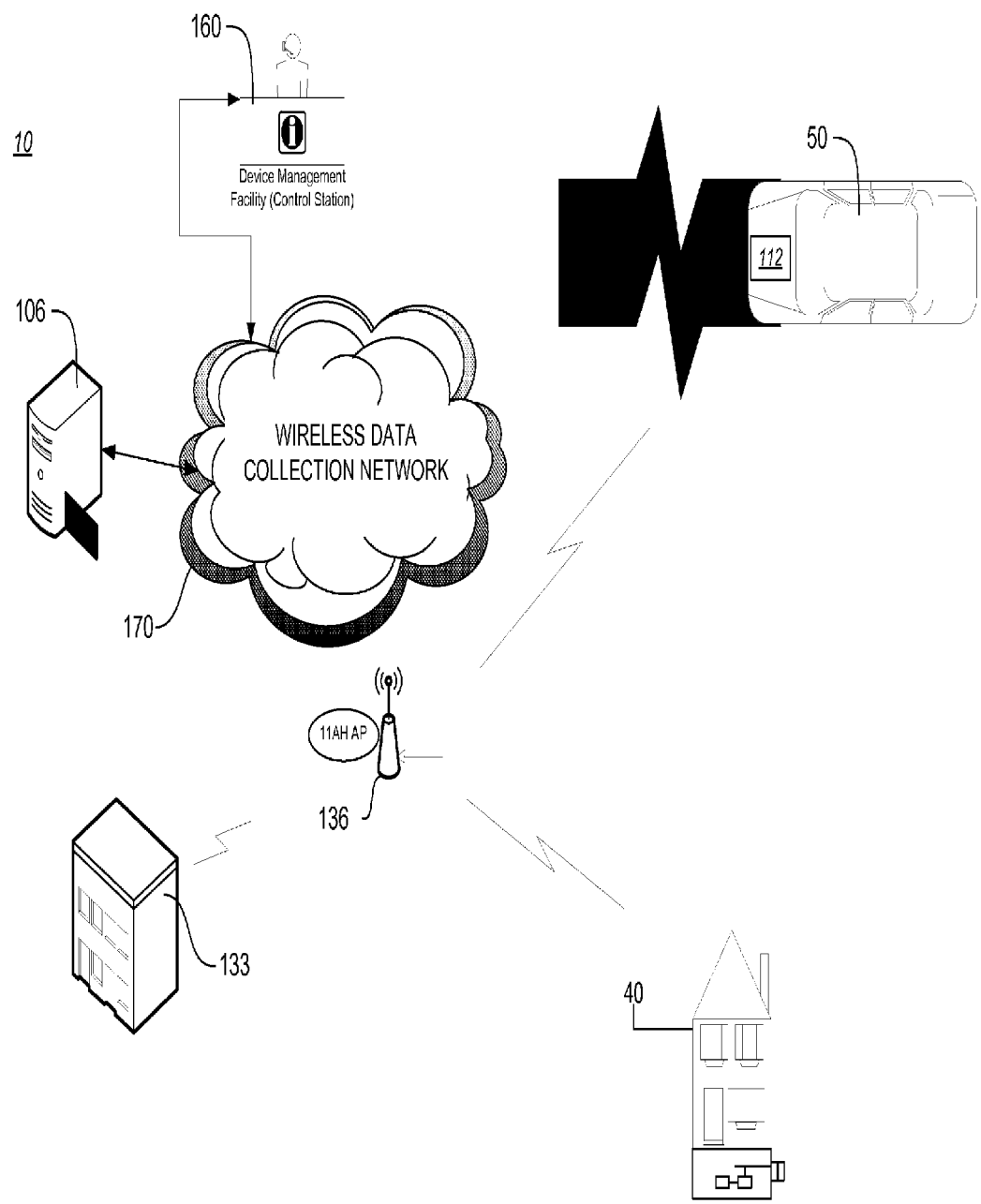
FIG. 1A illustrates the concept of sensor network deployment in accordance with an embodiment.

Various embodiments relate generally to wireless communications and more particularly to techniques for transmitting and receiving pilot tones. Embodiments may include improved techniques to manage pilot dwell times (N) for pilot rotation for a wireless multicarrier system. The improved techniques to manage pilot dwell times (N) may be advantageous for a number of application scenarios, such as managing shifting of pilot tones in a pilot tone shifting technique, managing pilot tone dwell times for space-time block code (STBC) techniques, managing pilot tone dwell times for transmit beamforming (TxBF) techniques, or any other communications techniques that may use fixed or variable pilot tone dwell times. The embodiments are not limited in this context.

An apparatus may comprise a memory configured to store a data structure with a set of modulation and coding schemes (MCS) available to an orthogonal frequency division multiplexing (OFDM) system, such as an IEEE 802.11ah system, among others. Each MCS may have an associated pilot dwell time (N). A pilot dwell time (N) may indicate a number of symbols to communicate a pilot tone on a subcarrier in a multicarrier system before shifting the pilot tone to another subcarrier in the multicarrier system. The apparatus may further comprise a processor circuit coupled to the memory, the processor circuit configured to identify a MCS to communicate a packet using multiple subcarriers of the OFDM system, and retrieve a pilot dwell time (N) associated with the MCS from the memory. The pilot dwell time (N) may indicate when to shift a pilot tone between subcarriers of the multiple subcarriers during communication of the packet. In this manner, a variable pilot dwell time (N) may be used to optimize performance of an OFDM system without adding any signaling overhead, thereby conserving bandwidth, power, and other valuable system resources. Other embodiments are described and claimed.

In a communications system, there is a need for an approach where a platform may facilitate updating an equalizer. A transmitter transmits one or more pilot tones in each orthogonal frequency division multiplexing (OFDM) symbol set and there are typically many OFDM symbols in a protocol data unit (PDU) or packet. With fixed pilot allocation the receiver is able to track the received signal sufficiently accurate with the pilot tones under most static channel conditions. According to embodiments the pilot tones may be rotated through each of the subcarriers over the packet. The pilot tones could for example be separated by a number of data subcarriers so as to simplify the estimation of slope and intercept for subcarrier tracking. As the pilot tones are swept across the band, the taps for the equalizer for the subcarriers for which the pilot tones currently populate would be updated as well. This approach allows the system to track channel changes over time when the channel is nonstationary.

According to one embodiment, a method comprises wirelessly transmitting a packet using a plurality of subcarriers; and sequentially assigning one or more pilot tones to one or more of the plurality of subcarriers during a time period of the packet so that a communication system receiving the packet can track channel changes over time.

According to another embodiment, an apparatus comprises a transmission channel to wirelessly transmit a packet using a plurality of subcarriers, wherein the transmission channel sequentially assigns one or more pilot tones to one or more of the plurality of subcarriers during a time period of the packet; and a channel estimation module coupled to an input module and configured to calculate channel estimates of the transmission channel from the one or more pilot tones; wherein sequentially assigning one or more pilot tones allows a system receiving the packet to track transmission channel changes over time.

According to yet another embodiment, the channel estimation module in an apparatus comprises equalizer taps, the equalizer taps having an input coupled to an adaptive algorithm process and the equalizer taps having an equalizer coefficients output coupled to generate channel changes.

According to another embodiment, a non-transitory machine-accessible medium provides instructions, which when accessed, cause a machine to perform operations, the non-transitory machine-accessible medium comprising code to cause at least one computer to wirelessly transmit a packet using a plurality of subcarriers and to sequentially assign one or more pilot tones to one or more of the plurality of subcarriers during a time period of the packet; and code to cause at least one computer, in a channel estimation module coupled to an input module, to calculate channel estimates of a transmission channel from the one or more pilot tones; wherein sequentially assigning one or more pilot tones allows a system receiving the packet to track transmission channel changes over time.

Exemplary embodiments are described herein. It is envisioned, however, that any system that incorporates features of any apparatus, method and/or system described herein are encompassed by the scope and spirit of the exemplary embodiments.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

An algorithm, technique or process is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors (or processor circuits) that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions.

The term "wireless device" as used herein includes, for example, a device capable of wireless communication, a communication device capable of wireless communication, a mobile terminal, a communication station capable of wireless communication, a portable or non-portable device capable of wireless communication, mobile terminal, or the like.

As used herein, the term "network" is used in its broadest sense to mean any system capable of passing communications from one entity to another. Thus, for example, a network can be, but is not limited to, a wide area network, a WiFi network, a cellular network, and/or any combination thereof.

As used herein, a "sensor network" is a wireless or wired network of nodes in which at least some of the nodes collect sensory data. A wireless sensor network (WSN) is a wireless network consisting of spatially distributed sensors to cooperatively monitor physical or environmental conditions. In many situations, a plurality, majority or even all of the nodes in a sensor network collect sensory data. Sensory data may include external sensory data obtained by measuring/detecting natural sources such as temperature, sound, wind, seismic activity or the like. Sensory data may also include external sensory data obtained by measuring/detecting man-made sources such as light, sound, various frequency spectrum signals, and the like. Sensory data may alternatively include data related to measuring/detecting sources internal to a sensor node (e.g., traffic flow on a network, and the like).

In IEEE 802.11ah (11ah), which is a new technology evolution for WiFi and is in the standards development phase, very low data rate operation is being enabled. In IEEE 802.11a/g, 20 MHz channel widths were defined and in IEEE 802.11n 40 MHz was added and then in IEEE 802.11ac both 80 and 160 MHz. In the past the evolution of WiFi has been to increase data rate, but IEEE 802.11ah actually targets comparatively lower rate services. In IEEE 802.11ah the bandwidths defined are 1 MHz and a set of down-clocked IEEE 802.11ac rates, namely 2, 4, 8 and 16 MHz, where the down clocking is 10. The 1 MHz rate is not derived from the IEEE 802.11n/ac rates, and thus this bandwidth mode is being designed more or less independently. Thus far in the process, the 1 MHz system is likely to use a 32 point FFT (as opposed to the minimum of 64 in IEEE 802.11ac). Of those 32 subcarriers, it is likely that 24 will be used for data and 2 for pilot. Additionally, a repetition mode is being included, which further lowers the data rate. It should be emphasized that these tone counts could change if performance requirements necessitate.

The identified target applications for IEEE 802.11ah are indoor and outdoor sensors (sensor network) and cellular offloading. It is likely the main application will be sensor networks, e.g. smart metering. The measure information at each node should be delivered to a fusion center like an access point. In any case, in most instances the payload is anticipated to be small (hundreds of bytes), but there are several use cases that have rather large payloads (a few thousand bytes). In these later cases, due to the low data rates of the IEEE 802.11ah system, a packet can exceed 100 milliseconds. In comparison, for the IEEE 802.11n/ac system a packet length of 2400 bytes transmitted at the lowest rate takes 3.2 ms, using the highest MCS this reduces to 0.3 ms and this is for only 1 stream. For these durations and the fact that the system was largely designed for indoor use, the channel is assumed stationary over the packet duration. With IEEE 802.11ah, which has a much lower data rate, and has use cases targeting outdoor, this assumption of channel stationarity is no longer valid.

The packet structure in previous versions of WiFi all have a preamble of fixed duration and a few pilot tones at fixed locations. The number of pilot tones and their location is different for the four (4) different bandwidths of IEEE 802.11ac, but for each of the bandwidths they are fixed. The issue with potentially long packets in IEEE 802.11ah is that in outdoor channels, the channel is not stationary over the packet. Thus additional equalizer training or pilot phase tracking using different pilot locations has been deemed desirable.

The approach to solve the problem was to arrive at a solution that would minimize the changes to the transmitter (Tx) and receiver (Rx) architecture from that of the previous IEEE 802.11a/g/n/ac versions. The solution outlined in this description is to use the pilot tones to continually update the equalizer, in addition to other receiver functionality. As noted above, in current versions of the standard the packets are relatively short in time. So the use of a preamble was justified and, assuming a stationary channel, was efficient from an overhead perspective. Also, with IEEE 802.11ah, where relatively low data rates are possible (using the lowest MCS's and single streams transmissions), which make the packet longer in time, and where outdoor usage models are contemplated, this channel stationarity assumption is no longer valid.

In previous versions of the standard, the preamble is typically used to estimate initial receiver parameters such as frequency offset estimation, timing estimation and such, in addition to computing the equalizer taps. The pilot tones were then typically used for tracking through the packet to maintain and improve frequency, time and phase estimation. To do that, the pilot tones are currently assigned to OFDM subcarriers in a fixed manner and then from there techniques are used to estimate these parameters across the band as needed. An example of a possible configuration for IEEE 802.11ah with fixed pilot tones at tone locations (+7,−7) is shown in FIG. 1C.

In addition, various types of communication systems may employ one or more of various types of signaling (e.g., orthogonal frequency division multiplexing (OFDM), code division multiple access (CDMA), synchronous code division multiple access (S-CDMA), time division multiple access (TDMA), and the like) to allow more than one user access to the communication system. In accordance with processing signals transmitted across a communication channel within such communication systems, one function that is often performed is that of channel estimation. From certain perspectives, channel estimation (variant definitions such as channel detection, channel response characterization, channel frequency response characterization, and the like) is an instrument by which at least some characteristics of the communication channel (e.g., attenuation, filtering properties, noise injection, and the like) can be modeled and compensated for by a receiving communication system.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The sensor network and the multi-band capable station illustrated in FIG. 1A and the related discussion are intended to provide a brief, general description of a suitable computing environment in which the invention may be implemented. Although only three stations (STAs) are shown for simplicity, the invention is not limited to any particular number of STAs.

FIG. 1A illustrates a sensor network 10 in accordance to an embodiment. A wireless sensor network can be defined as a network of devices, denoted as nodes, which are capable of sensing the environment and communicating the information gathered from the monitored field, e.g., an area or volume, through wireless links. The data is forwarded, possibly relays, to a controller or monitor (sink) that can use it locally or is connected to other networks, like the Internet, through a gateway. The nodes can be stationary or moving. They can be aware of their location or not. They can be homogeneous or not. A preferred embodiment of the present invention provides a sensor network, illustrated in FIG. 1A, as a flexible open architecture that serves as a communication platform for multiple deployment scenarios and sensor types. Sensors may track, for example, one or more intrusion, unauthorized, medical, or meter events. For example, a chemical sensor may take an air sample and measure its properties or a temperature sensor can measure temperature of buildings, cars, people, objects, and the like. A network according to a preferred embodiment, can be deployed to cover an area, indoor or outdoor, or deployed locally in rapid response emergency situations. Sensors can be placed in various fixed or mobile locations. Typical fixed locations include buildings, poles/towers for power or telephone lines or cellular towers or traffic lights. Typical mobile locations include vehicle such as auto, individuals, animals such as pets, or movable fixed locations.

The illustrated sensor network 10 comprises a device management facility/computer 160, a plurality of access points (AP) such as AP 136, also labeled 11ah AP to show that it is 11ah compliant, and a plurality of sensor nodes, devices or stations (STAs) such as sensor node 40 in a customer premise to perform smart metering functions, sensor node 50 to monitor vehicle functions, sensor node 106, and sensor node 133. A wireless data collection network 170 node is shown within the network (wireless sensor network 10) to provide reachback links to existing public or private infrastructure types such as cellular, land mobile radio, and wired or wireless access points. A wireless data collection network 170 works as both a sensor network data concentrator as well as a reachback vehicle with existing communication infrastructures like land mobile radio, cellular, broadband data, and the like. In essence, it provides transparent communications across different physical layers. The plurality of sensor nodes are positioned over a sensing region, and may be individually identified as sensor nodes $STA_1$, $STA_2$, ... $STA_N$. Any particular node N of the plurality of sensor nodes is able to communicate with one or more other sensor nodes, so as to form relay paths to one or more of the AP nodes such as AP 136. The sensor network 10 includes one or more communication devices 112 configured to establish a wireless and/or wired communication link across wireless data collection network 170 with one or more remote application servers. The communication devices 112 may include a desktop, a laptop, and/or a mobile computing device. Examples of mobile computing devices include, but are not limited to, a Smartphone, a tablet computer, and ultra-mobile personal computers.

Device management facility/computer 160 may be located within one of the AP nodes such as AP 136, or on a server, a laptop computer, a personal digital assistant (PDA), Smartphone, or a desktop computer. Functions performed by device management computer may in actual practice be located on one computer, or distributed across several computers with different programs to perform assigned individual functions. AP nodes such as AP 136 are typical of that known in the art. AP nodes serve as the gateway between some or all of the sensor nodes and the rest of the world, e.g., via the Internet. An 11ah compliant AP is capable of exchanging information with indoor and outdoor sensors and cellular offloading. In any case, in most instances the payload is anticipated to be small (hundreds of bytes), but there are several use cases that have rather large payloads (a few thousand bytes). In these later cases, due to the low data rates of the 11ah system, a packet can exceed 100 milliseconds. With 11ah, which has a much lower data rate, and has use cases targeting outdoor, this assumption of channel stationarity is no longer valid and thus additional equalizer training or pilot phase tracking using different pilot locations has been deemed necessary in order to estimate the signal across the entire data carrying portion of the band.

Figure 1B:
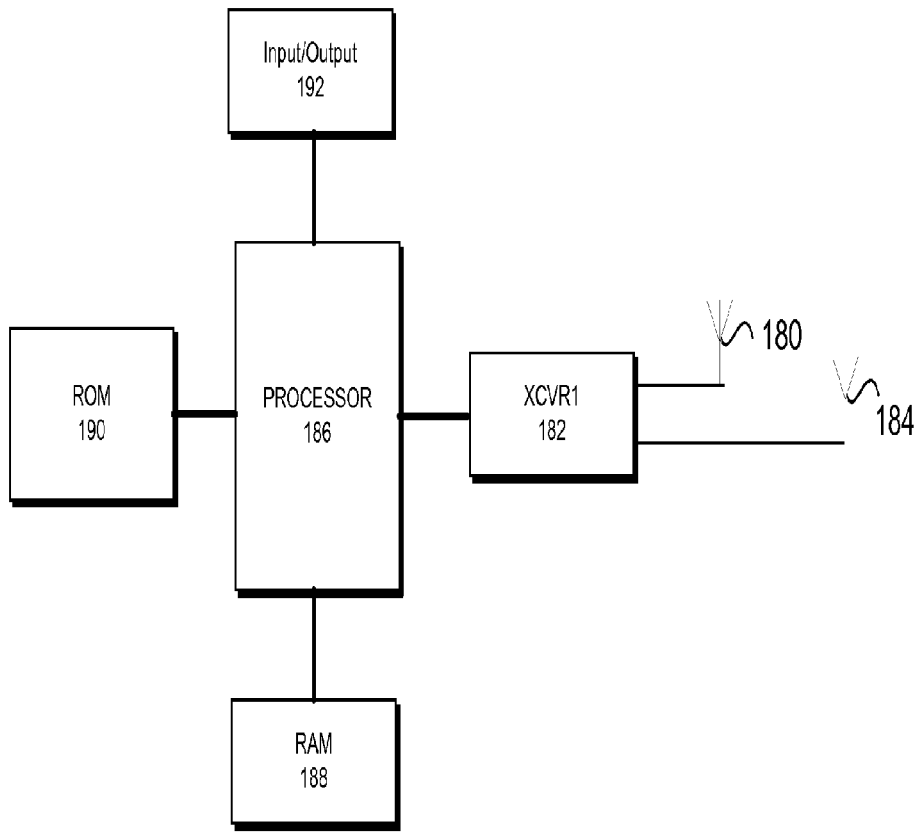
FIG. 1B is an exemplary communication device suitable for implementing different embodiments of the disclosure.
Figure 1C:
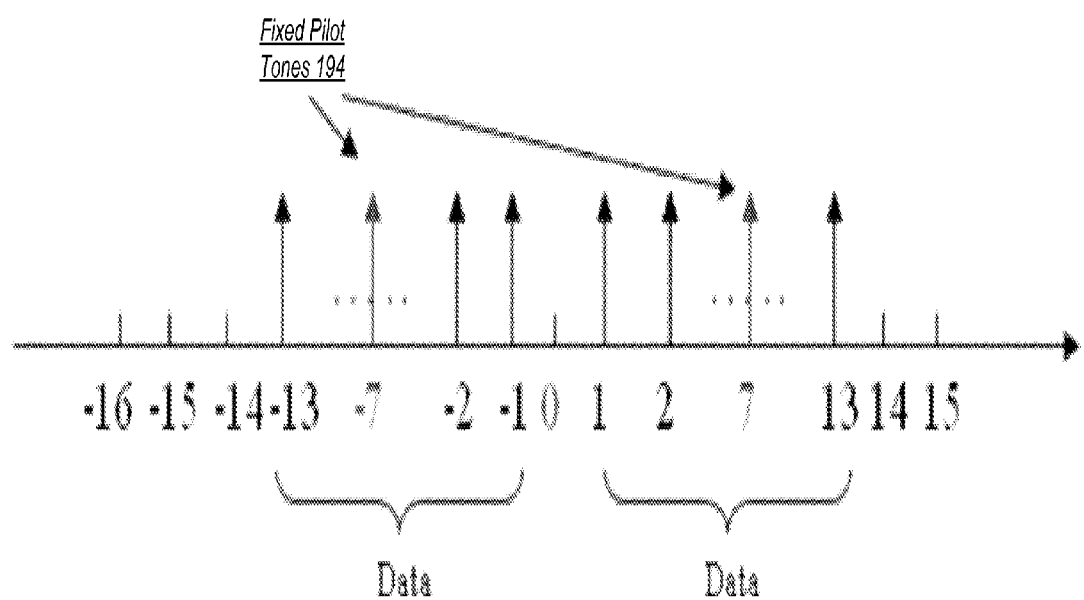
FIG. 1C is a diagram with fixed pilots in accordance with one embodiment.

FIG. 1B is an exemplary communication device 112 suitable for implementing different embodiments of the disclosure. The communication device 112 includes a processor 186 that is coupled to one or more memory devices, such as a read only memory (ROM) 190, a random access memory (RAM) 188, a transceiver 182 that is coupled to a first antenna 180 and to a second antenna 184, and an input/output (I/O) device 192. The processor 186 may be implemented as one or more processor chips.

Processor 186 may include, for example, a Central Processing Unit (CPU), a Digital Signal Processor (DSP), a microprocessor, a controller, a chip, a microchip, an Integrated Circuit (IC), or any other suitable multi-purpose or specific processor or controller. Processor 186 may, for example, process data received by communication device 112, and/or process data intended for transmission.

The ROM 190 is used to store instructions and perhaps data which are read during program execution. ROM 190 is a non-volatile memory device. The RAM 188 is used to store volatile data and perhaps to store instructions. The ROM 190 may include flash memories or electrically erasable programmable memory to support updating the stored instructions remotely, for example through an over-the-air interface via the transceivers 182 and/or 185 and the antennas 180 and/or 184.

The transceivers 182, 185 and the antennas 180, 184 support radio communications. Transceivers 180 and 184 are able to perform separate or integrated functions of receiving and/or transmitting/receiving wireless communication signals, tones, blocks, frames, transmission streams, packets, messages and/or data.

The I/O device 192 may be a keypad and a visual display to permit entering numbers and selecting functions. Alternatively, the I/O device 192 maybe a keyboard and a touch pad, such as a keyboard and a touch pad of a laptop computer. The processor 186 executes instructions, codes, computer-executable instructions, computer programs, and/or scripts which it accesses from ROM 190 or RAM 188.

FIG. 1C is a diagram with fixed pilots in accordance with one embodiment. More particularly, FIG. 1C illustrates an example of a possible configuration for IEEE 802.11ah with fixed pilot tones 194 at tone locations (+7,−7).

Figure 2:
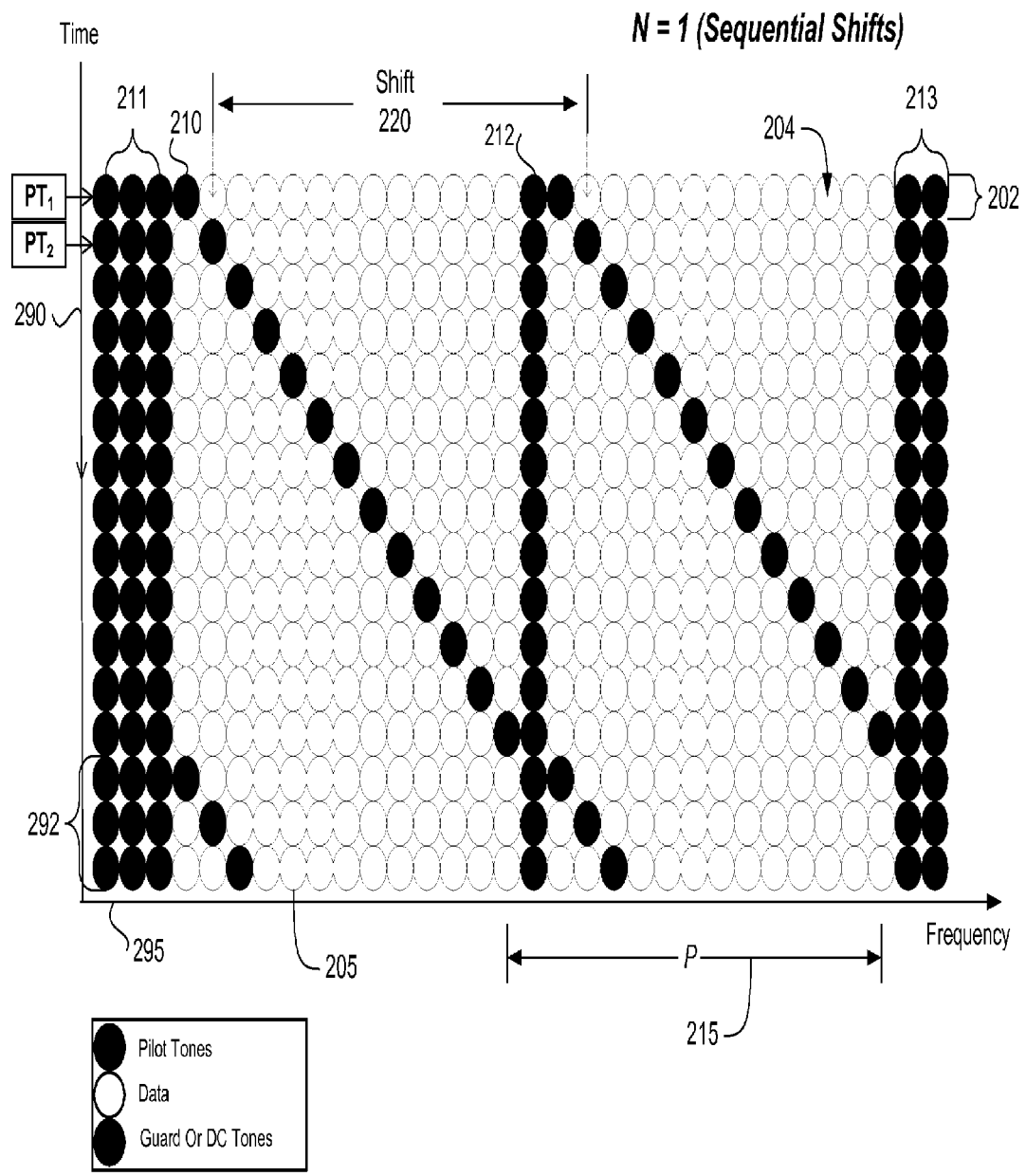
FIG. 2 is a first diagram of a packet/frame with pilot tones transmitted by a transmitter in accordance with an embodiment.

FIG. 2 is a diagram of a packet generated as a function of time with pilot tones transmitted by a transmitter in accordance with an embodiment. FIG. 2 shows a signal that comprises an OFDM symbol set 202. Each OFDM symbol set includes multiple data symbols modulated by distinct subcarriers 204 (e.g., subcarrier frequencies). Each OFDM symbol set includes pilot tones 210, data symbols 205, guard subcarriers 211 and 213, DC subcarriers (0 Hz) 212 although other configurations are possible. The DC and guard subcarriers are sometimes collectively called the null subcarriers/tones (null tones). Null tones are used in OFDM systems to protect against DC offset (DC subcarrier) and to protect against adjacent channel interference (guard subcarriers). Additionally, guard subcarriers are left blank to allow for fitting the transmitted waveform into a transmit spectral mask with less costly implementation.

Figure 3:
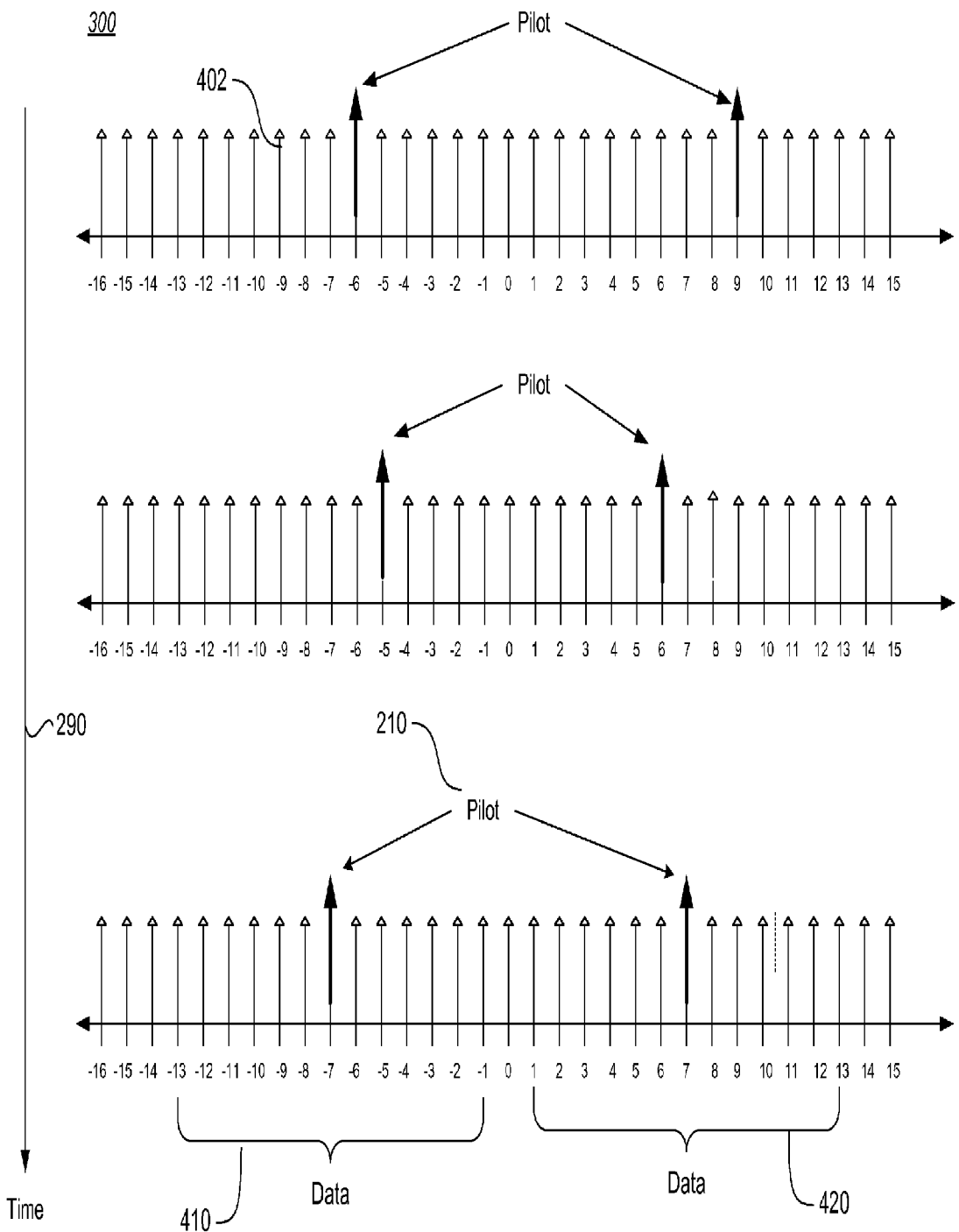
FIG. 3 illustrates a method for pilot shifting in an orthogonal frequency division multiplexing (OFDM) based communication system in accordance to an embodiment.

The pilot tones according to an embodiment may be assigned to one or more usable carriers (i.e. carriers not including guard or DC tones) such that, as shown by way of FIG. 2, they sweep through the usable carriers as a function of time, such as through all usable subcarriers. The pilot tones 210 may be modulated by the same sub-subcarrier frequency in each of the OFDM symbol sets but disposed at different sub-subcarrier positions in different symbol sets. In a sequential assignment of pilot tones, difference in position (P), spacing 215, between the pilot tones in the same symbol sets may be such that every n (n>=1) symbol position in a symbol set is occupied by a pilot tone. As shown the spacing between the pilot tones is fourteen (14) subcarriers and this fixed position may be maintained for each symbol set. FIG. 3 illustrates an alternative strategy where the spacing varies as a result of random assignment employed on the positioning of the pilot tones.

The pilot tones are disposed at different sub-subcarrier positions in different symbol sets through time by way of pilot tone shifting. Pilot tone shifting is a process where the pilot tones may be sequentially or randomly assigned to different sub-subcarrier as a function of time. As previously mentioned, only a subset of subcarriers may be used for pilot or usable carriers. For example, the pilot tones may be used only on data subcarriers (e.g., sweep through with the pilot tone on a symbol by symbol basis), avoid nulled subcarriers (e.g., DC subcarriers and guard subcarriers), and potentially even avoid data tones that are adjacent to guard or DC subcarriers. The pilot tones and their positioning can be based on channel conditions such as coding scheme, packet length, and the like. As shown on time axis 290, $PT_1$ (time=1 or a first time period of the packet being generated) the position of the pilot tones are −13 and 1; while at $PT_2$ (time=2) the positions are shifted by one and the pilot tones are assigned to −12 and 2. As shown the pilot tones 205 are shifted 220 one position in the time domain. The pilot tones could be shifted such that there is a shift every symbol set as shown, or could stay fixed for several symbol sets and then be shifted. The shifting of the pilot tones 210 can be based on the modulation and coding scheme (MCS) used for transmission or on the packet length of the transmission (i.e., channel conditions). Further, the amount of time the one or more pilot tones 210 occupy at a particular subcarrier could be based on a modulation and coding scheme (MCS), the MCS selected based on a data rate and a level of robustness required by traffic type. After a set of pilot tones are assigned, the process 292 of assigning pilot tones is repeated for each time period of a plurality of time periods.

FIG. 3 illustrates a method 300 for random pilot shifting as function of time in an OFDM-based communication system in accordance to an embodiment. This diagram shows multiple frames, at different times, of an OFDM signal with each frame including pilot tones 210, data tones 410 and 420, and null tones which are generally found at (−16, −15, 0, 14, and 15) for the 1 MHz bandwidth case example. While in a wireless network sensor a uniform modulation is used for all the data tones, an OFDM signal may comprise data tones 402 of different modulation types. Example of different modulation types are Quadrature phase-shift keying (QPSK) and Binary phase-shift keying (BPSK) which is of a relatively lower modulation order than QPSK. In FIG. 3, tone set (tones −12 and −11) may use a QPSK modulation type and there may be an even greater confidence associated with a symbol extracted from that data tone to qualify it as a pseudo-pilot tone. Tone set (tones 10 and 11) could be data tones whose corresponding symbols have relatively lower modulation order types (such as below, e.g., 16 QAM, BPSK, and the like) may qualify more frequently for pilot tone insertion than data tones whose corresponding symbols have relatively higher modulation order types like QPSK.

Additionally, the amount of time the pilot tones occupy a particular subcarrier could be dependent on modulation and coding scheme (MCS). For example in .11ah, where a new BPSK rate ½ mode is defined with a repetition coding of 2×, the fixed duration could be longer than that of the MCS0, BPSK rate ½ mode which has no repetition.

Finally, the approach allows the system to use fixed pilot tones for packets which are short in duration as in previous versions of the standard so as to minimize the processing. Thus, it allows the option of using the technique in all packet transmissions, or to only be used for configurations such as low MCS's with 1-stream and large payloads. Using MCS and packet length to determine the setting for the pilot rotation allows a simple design since these parameters are signaled in the preamble in the signal field(s).

Figure 4:
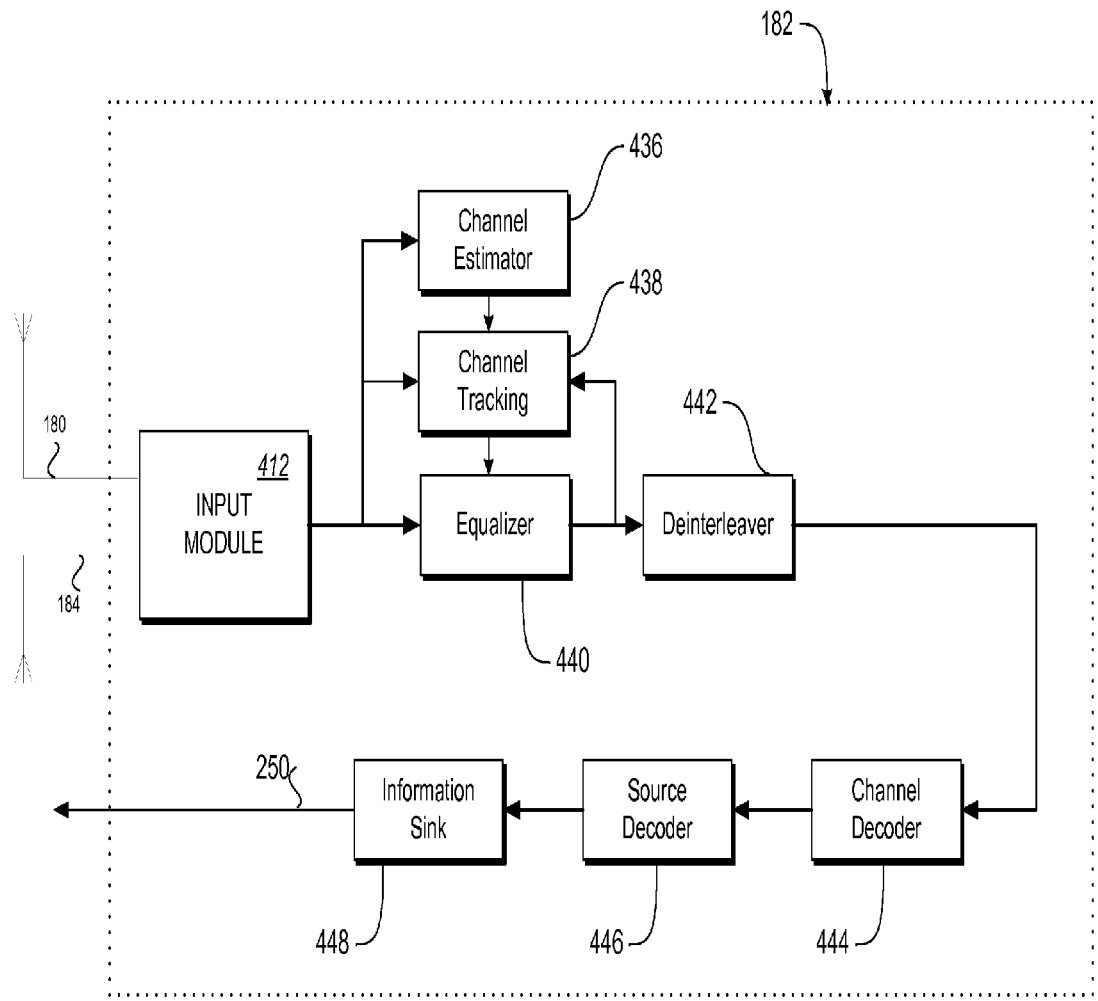
FIG. 4 is an illustrates part of a transceiver with equalizer for processing pilot tones and data tones in accordance with an embodiment.

FIG. 4 illustrates part of a transceiver 182 with equalizer for processing pilot tones and data tones in accordance to an embodiment. Receiver 182 comprises an antenna 180, an input module 412, an adaptive equalizer 220 running an equalizer application 240 or instructions, and channel estimation module 230.

Input module 412 includes an interface to provided signals to adaptive equalizer 440 and other circuits from antenna 180. Input module may comprise filters, delay elements, and taps with their corresponding coefficients to provide an output which depends on the instantaneous state of the radio channel.

The tap coefficients are weight values which may be adjusted based on the pilot tones to achieve a specific level of performance, and preferably to optimize signal quality at the receiver. In one embodiment, the receiving system is able to track channel changes over time (e.g., using the pilot tones to update the equalizer taps) because of the rotation of the pilot tones through each of the OFDM subcarriers over the packet through time. As noted above, the pilot tones are separated by some number of data subcarriers so that estimation of slope and intercept for subcarrier is simplified. As the pilot tones are swept across the band, the taps for the equalizer for the subcarriers for which the pilot tones currently populate may be updated as well.

The pilot tones 210 are received at antenna 180 and converted to a baseband representation by input module 412. The received pilot tones are then input into the channel estimator 436 which uses the received sequences to determine initial channel estimates for the wireless channel (using, for example, a least squares approach). The channel estimator 436 may have a priori knowledge of the transmitted pilot tones which it compares to the received signals to determine the initial channel estimates. The initial channel estimates may then be delivered to the channel tracking unit 438. The data signals are received by the antenna 180 and converted to a baseband representation within the transceiver 182 input module 412. The data signals are then delivered to the input of the equalizer 440 which filters the signals in a manner dictated by the channel taps currently being applied to the equalizer 440. The equalizer 440 may include any type of equalizer structure (including, for example, a transversal filter, a maximum likelihood sequence estimator (MLSE), and others). When properly configured, the equalizer 440 may reduce or eliminate undesirable channel effects within the received signals (e.g., inter-symbol interference).

The received data signals with pilot tones 210 are also delivered to the input of the channel tracking unit 438 which uses the received signals to track the channel taps applied to the equalizer 440. During system operation, these taps are regularly updated by the channel tracking unit 438 based on the magnitude and phase of the pilot tones. In addition to the receive data, the channel tracking unit 438 also receives data from an output of the equalizer 440 as feedback for use in the channel tracking process. The channel tracking unit 438 uses the initial channel estimates determined by the channel estimator 436 to determine the channel taps covariance matrix (C). In one embodiment, for example, channel tracking unit 438 then determines the value of the constant b (related to the channel changing rate) and calculates the taps changing covariance matrix (b*C). The square root of the taps changing covariance matrix is then determined and used within a modified least mean square (LMS) algorithm to determine the updated channel taps, which are then applied to the equalizer 440. The output of the equalizer 440 is de-interleaved in the de-interleaver 442. Channel and source coding is then removed from the signal in the channel decoder 444 and the source decoder 446, respectively. The resulting information is then delivered to the information sink 448 which may include a user device, a memory, or other data destination as shown by output 250.

Figure 5:
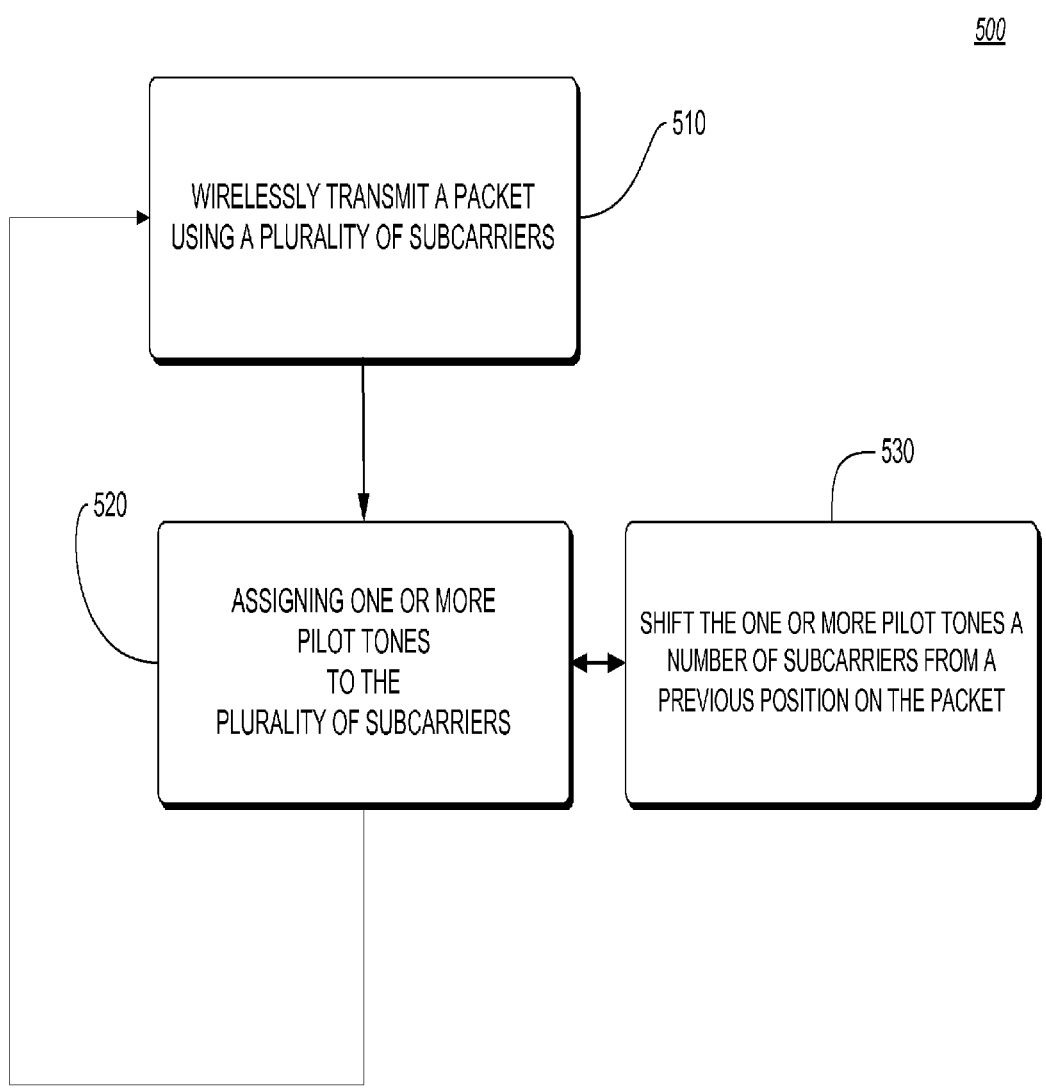
FIG. 5 is a flowchart of a method for tone allocation in a transmitter in accordance with an embodiment.

FIG. 5 is a flowchart of a method for tone allocation in a transmitter in accordance to an embodiment. Method 500 begins with action 510 and is repeated for every packet. In action 510, a device such as communication device 112 wirelessly transmits a packet using a plurality of subcarriers that may include pilot, data, and null tones. Control is then passed to action 520 where the process assigns one or more pilot tones to the plurality of subcarriers. The assignment of the one or more pilot tones in action 520 is done in conjunction with action 530 that shifts the one or more pilot tones a number of subcarriers from a previous position on the packet. Control is then returned to action 520 where the pilot tones are assigned to particular subcarriers of the OFDM signal. Control is then passed to action 510 where wireless communication is conducted by the communication device. The shifting of the pilot tones as noted earlier could be either fixed, for example a shift every symbol, variably shifted where the pilot tones stay fixed for several symbols and then varied, or it could be randomly shifted in accordance to a uniform distribution.

FIG. 6 illustrates an exemplary pilot dwell time table 600 in accordance with one embodiment. The pilot dwell time table 600 may store, among other types of information, a set of MCS available to an OFDM system, each MCS having an associated pilot dwell time (N). A pilot dwell time (N) may indicate a number of symbols to communicate a pilot tone 210 on a subcarrier 204 in a multicarrier system before shifting the pilot tone 210 to another subcarrier 204 in the multicarrier system. The pilot dwell time table 600 may be stored as any type of data structure in a storage medium, such as RAM 188, ROM 190, and other storage mediums suitable for use with an OFDM system and OFDM devices. Although referred to as a pilot dwell time table 600, it may be appreciated that the information described for the pilot dwell time table 600 may be stored in any data structure, such as an array, linked list, database, relational database, lookup table (LUT), and so forth. The embodiments are not limited in this context.

It may be appreciated that although some embodiments describe the use of pilot dwell time (N) and the pilot dwell time table 600 in the context of managing shifting of pilot tones for one or more pilot tone shifting techniques, the pilot dwell time (N) and the pilot dwell time table 600 may be used for other applications, such as for managing pilot tone dwell times for space-time block code (STBC) techniques, managing pilot tone dwell times for transmit beamforming (TxBF) techniques, or any other communications techniques that may use fixed or variable pilot tone dwell times. For example, there are other transmit modes that result in different operating conditions (e.g., SNR), and thus would use different N values due to the varying operating conditions. With TxBF, for example, the values given with the pilot dwell time table 600 as shown in FIG. 6 could be used, with N incremented or decremented by one or more integers. With STBC, for example, different N values could be used for different STBC modes. Additionally, the use of different encoders could result with different N values. For instance, convolutional encoders may use the values given with the pilot dwell time table 600 as shown in FIG. 6, while LDPC encoders may use the values given with the pilot dwell time table 600 as shown in FIG. 6 and decremented by one or more. The embodiments are not limited to these examples.

As previously described with reference to FIGS. 1-5, pilot tones 210 may be disposed at different sub-subcarrier positions in different OFDM symbol sets 202 through time by way of pilot tone shifting. Pilot tone shifting is a process where the pilot tones 210 may be sequentially or randomly assigned to different subcarrier 204 as a function of time. The pilot tones could be shifted such that there is a shift every symbol set as shown in FIG. 2, or could stay fixed for several symbol sets and then be shifted. In the latter case, the amount of time pilot tones 210 occupy a particular subcarrier 204 may be indicated by a pilot dwell time (N) stored in the pilot dwell time table 600.

With pilot tone shifting (or pilot tone rotation), a pilot tone 210 is shifted to a new location every N symbols, where N is a system parameter. Thus, the pilot tone 210 remains constant for N symbols, then shifts to the next location. A receiver may then use the N pilot symbols to make a channel estimate using an appropriate algorithm. The system could be designed with a single fixed value of N, but that does not allow for optimization.

In various embodiments, the sensor network 10 may use several values for N, where N is any positive integer. In one embodiment, for example, values for N may range from 1 to 8 OFDM symbols. Using different values for N may allow a pilot tone 210 to be communicated on a particular subcarrier 204 for varying amounts of time. A larger value for N may indicate a greater amount of time a pilot tone 210 is communicated on a subcarrier 204, which provides a longer integration time and potentially higher signal-to-noise ratio (SNR) for an estimate. Conversely, a smaller value for N may indicate a lesser amount of time a pilot tone 210 is communicated on a subcarrier 204, which provides a shorter integration time and potentially lower SNR for an estimate. Therefore, N may be customized for a particular packet, media, channel, device, or system to improve overall performance.

One problem associated with using a variable N, however, is that a receiver needs to be informed about the value of N (e.g., the dwell time before a pilot rotation or shift) that will be used in a packet. One approach is to signal this information to the physical (PHY) layer using a signal (SIG) field of a preamble. A major drawback of this approach is that signaling of 1 to 8 values would require 3 bits in the SIG field. Unfortunately for a 1 MHz system, there are very few data tones and with repetition, adding an extra symbol equates to adding 2 symbols with repetition. Even if a 1 MHz system would have additional bits to signal a value for N, this would increase signaling traffic in a network thereby consuming more bandwidth and other network resources.

Various embodiments provide a technique for a multicarrier system to utilize a variable pilot dwell time that is automatically known to both a transmitter and receiver through other system parameters, while reducing or eliminating the need to signal the variable pilot dwell time to either the transmitter or the receiver. In one embodiment, for example, this may be accomplished by associating fixed pilot dwell times (N) with a MCS used for a packet, as shown by the pilot dwell time table 600 of FIG. 6. The design trade-off for pilot tone shifting systems (and other systems such as STBC, TxBF or channel coding types) is that for stationary channels, a larger N indicates a longer dwell time and subsequent better performance. Since the channel is stationary, the longer integration gives a better SNR for an estimate, as demonstrated in FIGS. 9, 10, which shows that performance is better than a system with no pilot rotation (e.g., N>4). This is because integration time for each pilot tone 210 is longer than an original preamble which was used for the initial channel estimate for all pilot tones 210. With the addition of Doppler, longer integration times can start to degrade performance relative to shorter integration times. As a note, even long integration times are better than not using pilot tone rotation as in 802.11n/ac systems. Nonetheless, it is useful to have N configured in order to optimize the system, but without adding additional overhead with signaling.

Referring again to FIG. 6, the pilot dwell time table 600 may store, among other types of information, a set of MCS available to an OFDM system, each MCS having an associated pilot dwell time (N). In one embodiment, selecting a pilot dwell time (N) to associate with a given MCS may be empirically derived based on historical information for the sensor network 10, and encoded in the pilot dwell time table 600. Values for the pilot dwell time table 600 stored in memory of various devices (e.g., sensor nodes 40, 50, 106, and/or 133) may be updated on a periodic, aperiodic, continuous, or on-demand basis.

In some cases, it may be possible so select a value of N to associate with a given MCS based on instantaneous channel information, and update the values of the pilot dwell time table 600 stored in memory of various devices (e.g., sensor nodes 40, 50, 106, and/or 133) accordingly. However, this approach has some design trade-offs. Selecting a value for N based on instantaneous channel information is very difficult in an IEEE 802.11ah system which has a main use case of low power sensors. For example, these devices exchange information infrequently and additionally are typically very low power devices, so a design constraint is to minimize their time "awake." Further, frequent updates would add additional overhead to all transmissions, even those where pilot rotation is not enabled, thereby impacting the system throughput and device power consumption.

The pilot dwell time table 600 may include, among other types of information, a MCS field 602, a modulation field 604, a code rate field 606, and a pilot dwell time (N) field 608. The MCS field 602 may store a code index for a particular type of MCS, such as MCS0 to MCS9, for example. The modulation field 604 may store a modulation type associated with each code index, such as binary phase-shift keying (BPSK), quadrature phase-shift keying (QPSK), 16 quadrature amplitude modulation (QAM) (16-QAM), 64-QAM, 256-QAM, and so forth. The code rate field 606 may store a code rate of a convolutional code associated with each code index, such as ½, ⅔, ¾, ⅚ and so forth. The pilot dwell time (N) field 608 may store an integer value for N, such as 1-8 symbols. In this configuration, a code index from the MCS field 602 may indicate different types of associated information. For instance, a code index 610 of MCS4 may be associated with a modulation type of 16-QAM, a ¾ code rate, and N=2. It may be appreciated that the fields and values shown in the pilot dwell time table 600 are merely examples, and other fields and values may be implemented for a given pilot dwell time table 600. For instance, a field (not shown) may be added to the pilot dwell time table 600 to indicate a pilot tone shifting pattern, such as sequential or random, for instance.

Figure 7:
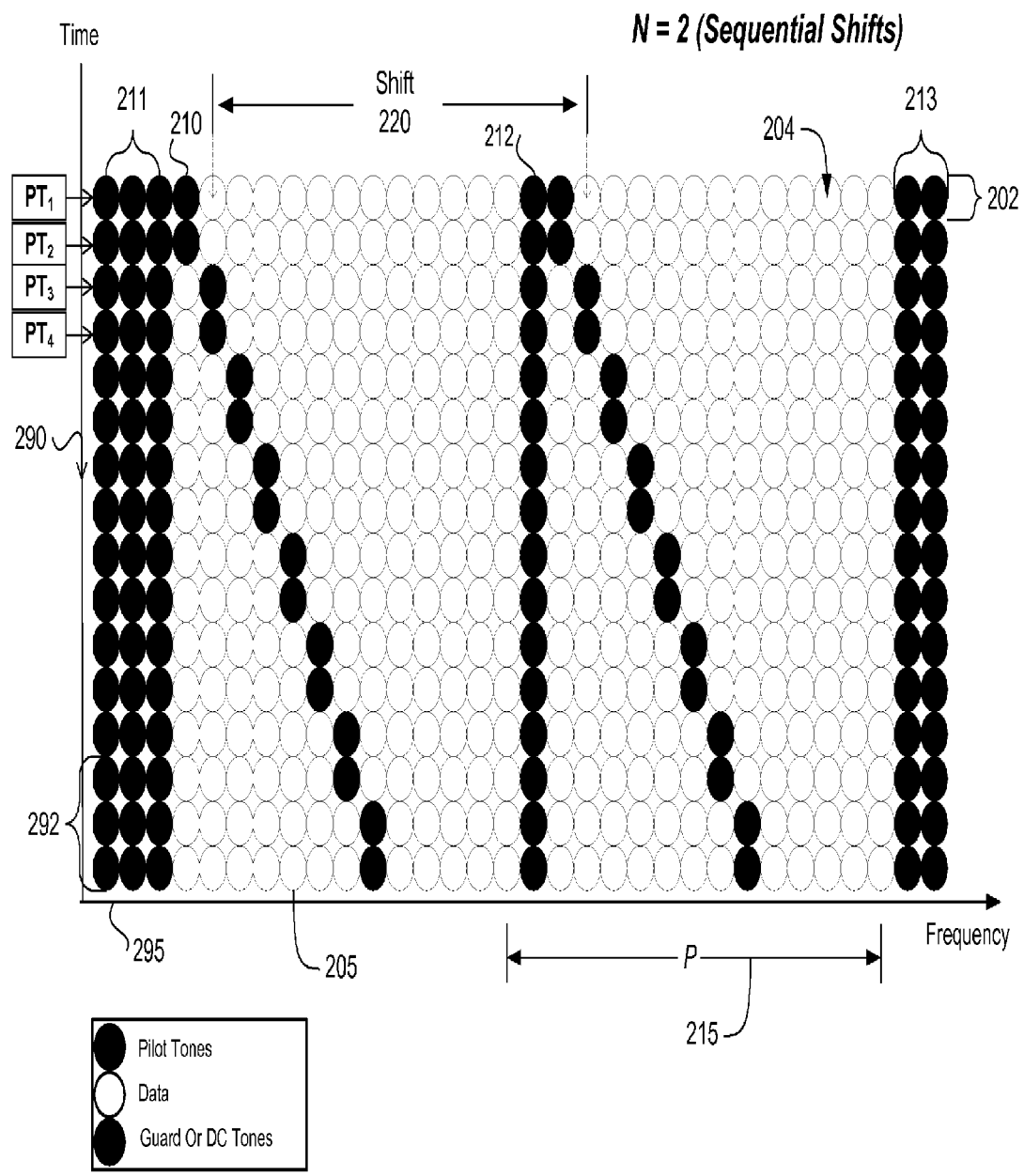
FIG. 7 is a second diagram of a packet/frame with pilot tones transmitted by a transmitter in accordance with an embodiment.

FIG. 7 is a diagram of a packet generated as a function of time with pilot tones transmitted by a transmitter in a sequential manner. As previously described with reference to FIG. 2, pilot tones 210 may be disposed at different sub-subcarrier positions in different symbol sets through time by way of pilot tone shifting. In one embodiment, the pilot tones 210 could be shifted to different subcarriers as indicated by a pilot dwell time (N) stored in the pilot dwell time table 600. The pilot dwell time table 600 may be stored in both a transmitting device and a receiving device. In this manner, once the transmitting device and the receiving device select or agree on a MCS for a channel or packet, such as through a rate adaptation process to converge on an optimal MCS from a throughput perspective, the transmitting device and the receiving device may retrieve a pilot dwell time (N) associated with the selected MCS from local pilot dwell time tables 600 without any additional signaling exchanged between the devices.

In one embodiment, for example, a processor circuit (e.g., processor 186) for a transmitting device and/or a receiving device may be configured to identify a MCS to communicate a packet using multiple subcarriers 204 of an OFDM system, such as sensor network 10. The processor circuit may retrieve a pilot dwell time (N) from the pilot dwell time field 608 associated with the identified MCS from the pilot dwell time table 600 stored in memory. The pilot dwell time (N) may indicate when to shift a pilot tone 210 between subcarriers 204 during communication of the packet. In one embodiment, for example, the pilot dwell time (N) may indicate a shift of a pilot tone 210 from a first subcarrier $204_1$ to a second subcarrier $204_2$ of the multiple subcarriers 204 every 1 to 8 OFDM symbols. However, the embodiments are not limited to these values.

Pilot tone shifting may occur in either a sequential or random manner. This may be a configurable parameter stored by the transmitting device and receiving device, such as through another field added to the pilot dwell time table 600. Alternatively, in addition to the pilot dwell time (N) indicating a shift of a pilot tone 210 from a first subcarrier $204_1$ to a second subcarrier $204_2$, the pilot dwell time (N) may further indicate whether the shift between subcarriers 204 should occur in a sequential or random manner. For instance, certain values for N may indicate sequential shifts (e.g., when N=1 to 4), while other values for N may indicate random shifts (e.g., when N=5 to 8). Embodiments are not limited in this context.

FIG. 7 illustrates a case of pilot shifting when N=2 and sequential shifts. As shown on time axis 290, at $PT_1$ (time=1 or a first time period of the packet) the position of the pilot tones 210 of the OFDM symbol set 202 are −13 and 1. At $PT_2$ (time=2), the position of the pilot tones 210 remain at −13 and 1 as indicated by N=2. At $PT_3$ (time=3), the positions are shifted by one and the pilot tones 210 are assigned to −12 and 2. As shown the pilot tones 210 are shifted 220 one position in the time domain. At $PT_4$ (time=4), the position of the pilot tones 210 remain at −12 and 2, again as indicated by N=2. After a set of pilot tones 210 are assigned, the process 292 of assigning pilot tones is repeated for each time period of a plurality of time periods in a sequential manner.

Figure 8:
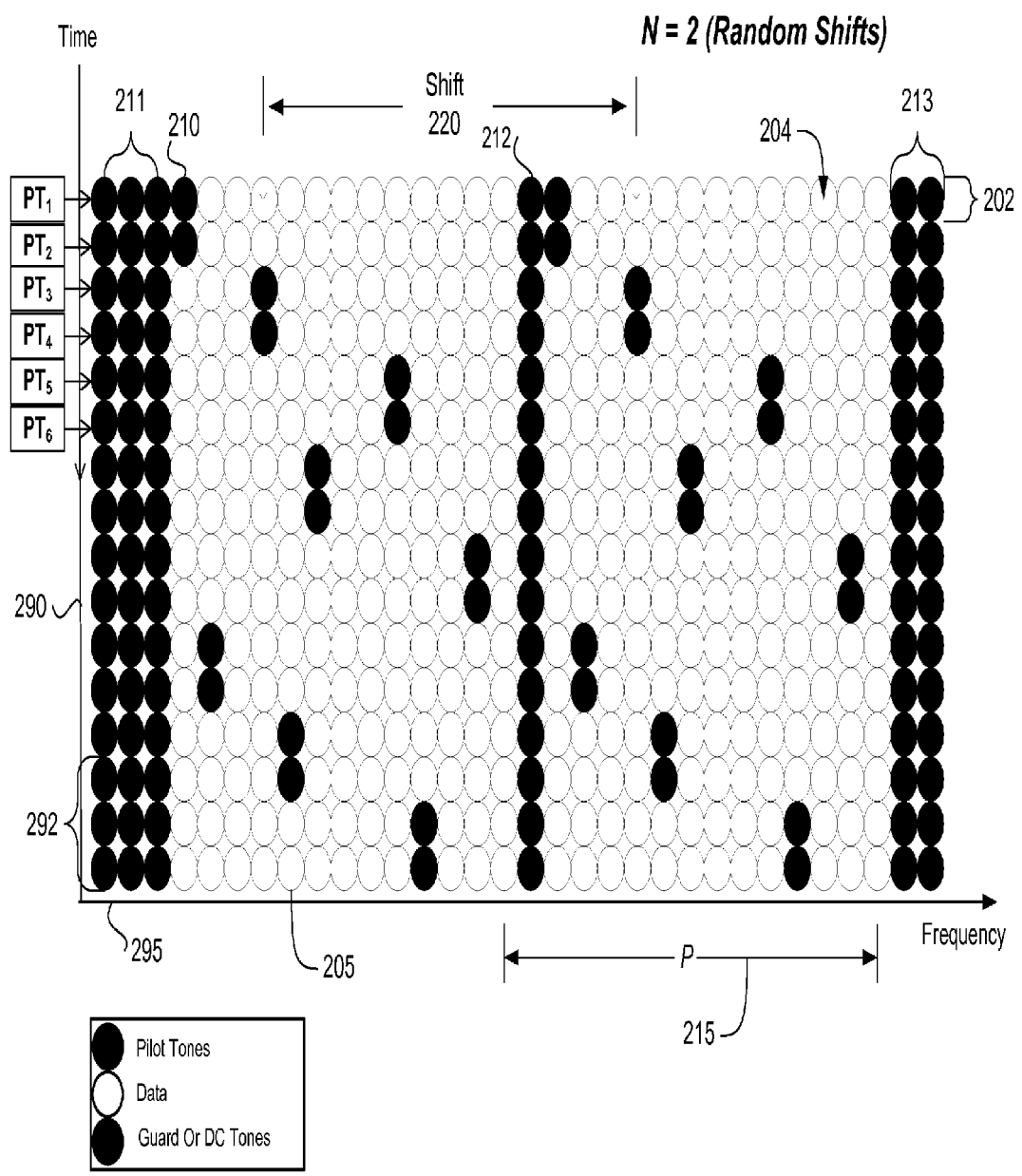
FIG. 8 is a third diagram of a packet/frame with pilot tones transmitted by a transmitter in accordance with an embodiment.

FIG. 8 is a diagram of a packet generated as a function of time with pilot tones transmitted by a transmitter in a random manner. More particularly, FIG. 8 illustrates a case of pilot shifting when N=2 and random shifts. As shown on time axis 290, at $PT_1$ (time=1) the position of the pilot tones 210 are −13 and 1. At $PT_2$ (time=2), the position of the pilot tones 210 remain at −13 and 1 as indicated by N=2. At $PT_3$ (time=3), the positions are shifted by a random number of positions and the pilot tones 210 are assigned to −10 and 4. As shown the pilot tones 210 are shifted 220 three positions in the time domain. At $PT_4$ (time=4), the position of the pilot tones 210 remain at −10 and 4, again as indicated by N=2. At $PT_5$ (time=5), the positions are again shifted by a random number of positions and the pilot tones 210 are assigned to −5 and 9. As shown the pilot tones 210 are shifted 220 five positions in the time domain. At $PT_6$ (time=6), the position of the pilot tones 210 remain at −5 and 9, again as indicated by N=2. After a set of pilot tones 210 are assigned, the process 292 of assigning pilot tones is repeated for each time period of a plurality of time periods in a random manner.

It may be appreciated that in FIGS. 7, 8, the spacing between pilot tones 210 for a given OFDM symbol set 202 remain a fixed number of positions apart, which in this case is fourteen (14) subcarriers, regardless of whether the pilot tone shifts are sequential or random. Alternatively, in some cases, the spacing between pilot tones 210 may vary as well. The embodiments are not limited in this context.

Figure 9:
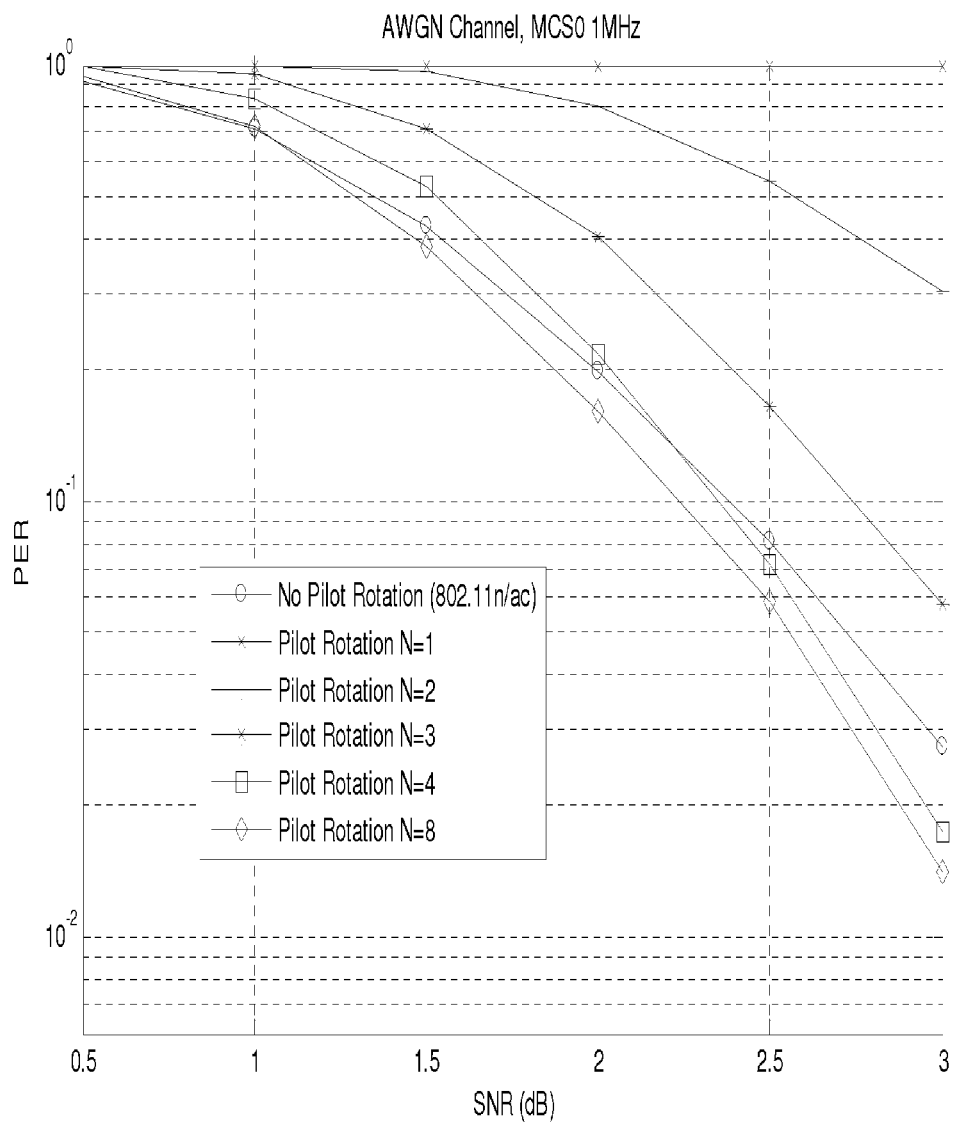
FIG. 9 is a diagram illustrating system performance with a modulation and coding scheme (MCS) zero (0) from the pilot dwell time table shown in FIG. 6 in accordance with one embodiment.

FIG. 9 is a diagram illustrating system performance with a MCS0 from the pilot dwell time table 600 shown in FIG. 6. A study was done to determine the appropriate selection of the pilot rotation dwell time (N), and the MCS used. For brevity only a few cases are shown here to provide insight to the final selection of N in the pilot dwell time table 600. FIG. 9 illustrates system performance with MCS0 (BPSK rate ½). As can be seen in FIG. 9, to attain sufficient integration a total of 4 symbols (e.g., N=4) are needed to match the performance with no pilot rotation. This is a positive result since the preamble used for initial channel estimation was also 4 symbols long and used BPSK signaling.

Figure 10:
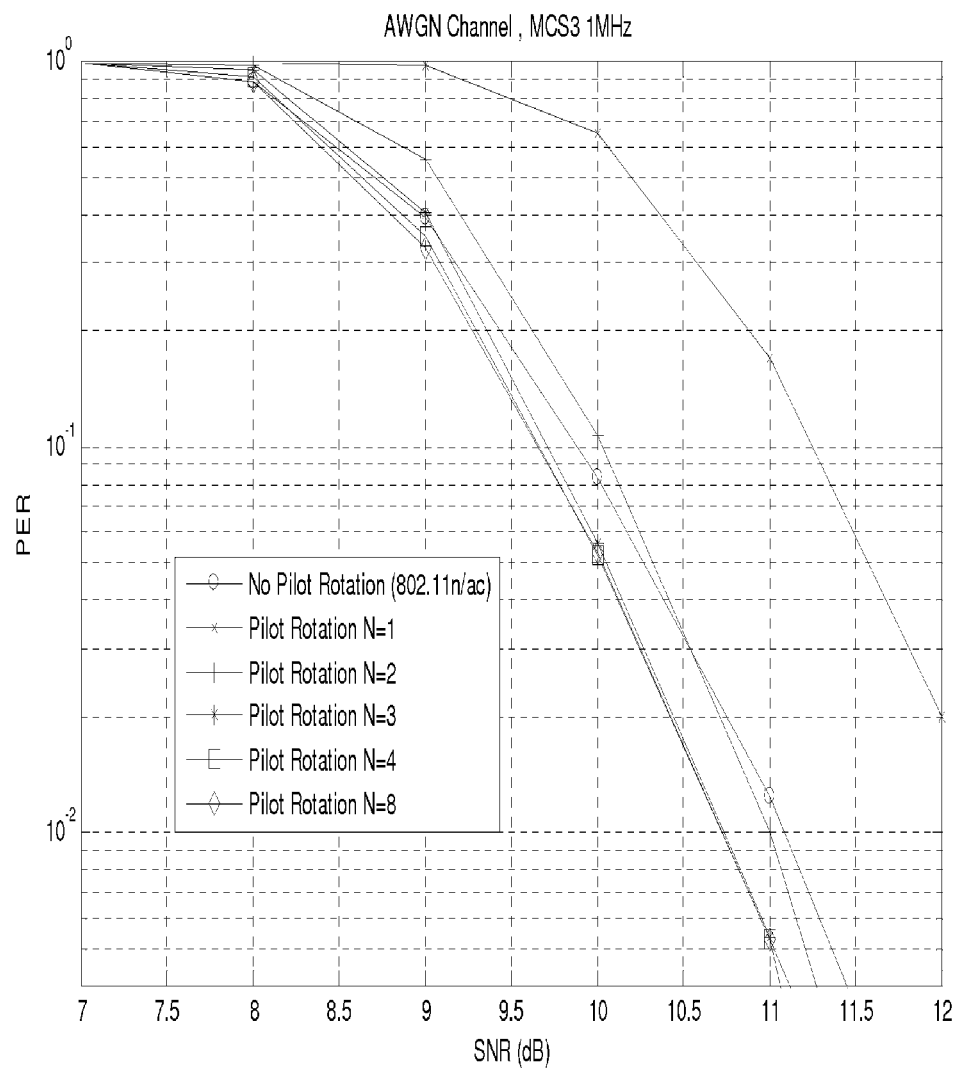
FIG. 10 is a diagram illustrating system performance with a MCS three (3) from the pilot dwell time table shown in FIG. 6 in accordance with one embodiment.

FIG. 10 is a diagram illustrating system performance with a MCS3 from the pilot dwell time table 600 shown in FIG. 6. FIG. 10 illustrates system performance with MCS3 (16-QAM rate ½). As can be seen in FIG. 10, MCS3 utilizes 16-QAM and therefore requires a higher SNR to meet a packet error rate (PER) target. As such MCS3 only requires an integration time of N=2 to match the performance with no pilot rotation (e.g., such as an 802.11n/ac system). Thus, integration time beyond this is not justified. This allows better Doppler tracking without comprising the system in stationary channels. Based on the study, the pilot dwell time table 600 was created and is proposed as inclusion in the 802.11ah standard. The approach is to signal the receiver that pilot rotation is used, and once it is determined that pilot rotation is to be used in the transmitter, it will use the N value based on the MCS selection as outlined in the pilot dwell time table 600. It is worthy to note that pilot rotation is not necessarily used in each packet, and is typically based on the packet time on air.

Figure 11:
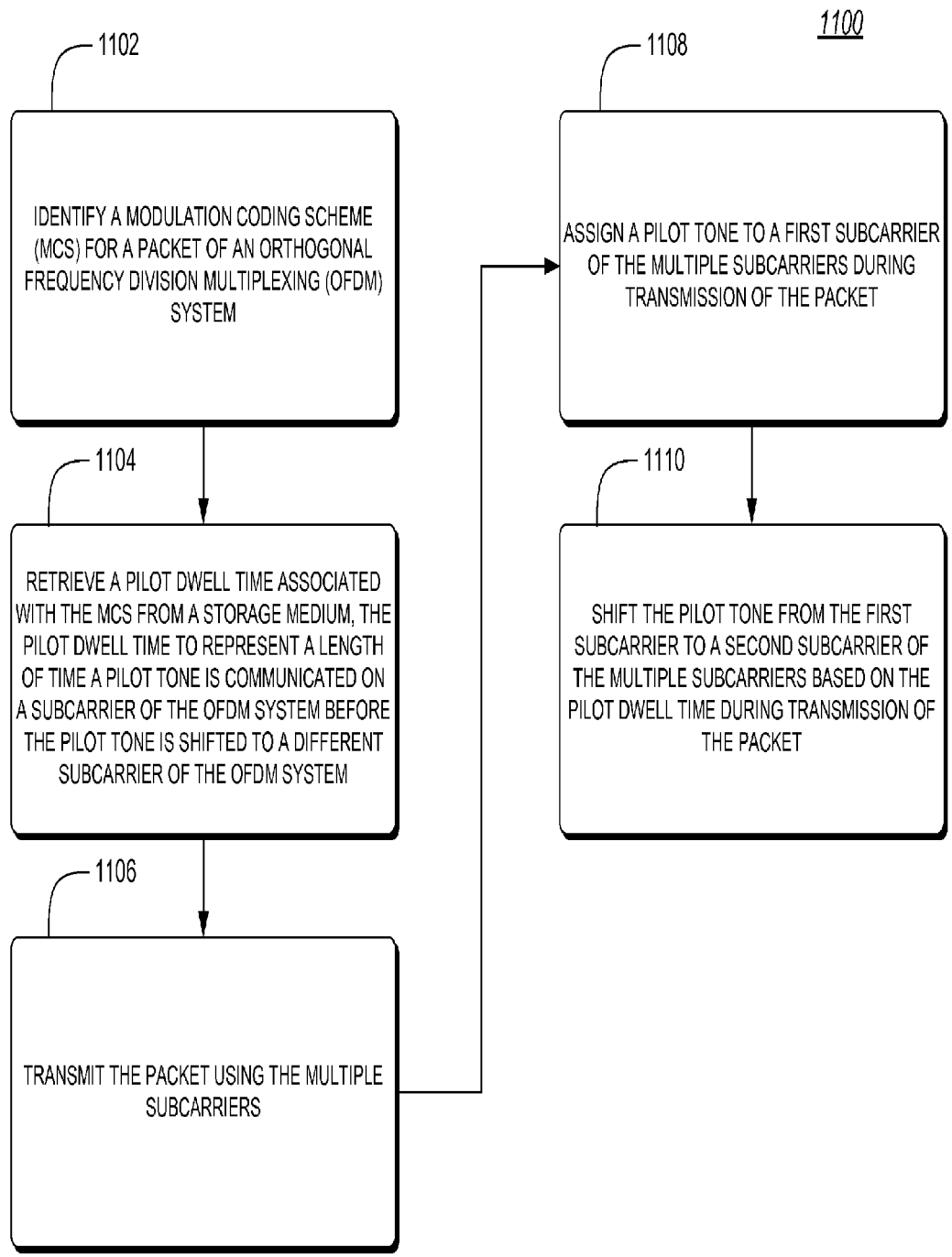
FIG. 11 is a second flowchart of a method for tone allocation in a transmitter in accordance with an embodiment.

FIG. 11 is a flowchart of a method 1100 for tone allocation in a transmitter in accordance with an embodiment. For instance, the method 1100 may be utilized in various transmitting devices (e.g., sensor nodes 40, 50, 106, and/or 133) via the transceiver 182.

As shown in FIG. 11, method 1100 may identify a MCS for a packet of an OFDM system at block 1102. For instance, a sensor node (e.g., sensor nodes 40, 50, 106, and/or 133) may identify a MCS for a packet of an OFDM system through a rate adaptation process.

The method 1100 may retrieve a pilot dwell time associated with the MCS from a storage medium, the pilot dwell time to represent a length of time a pilot tone is communicated on a subcarrier of the OFDM system before the pilot tone is shifted to a different subcarrier of the OFDM system, at block 1104. For instance, the processor 186 may retrieve a pilot dwell time (N) associated with the MCS from the pilot dwell time table 600 stored in RAM 188 or ROM 190. The pilot dwell time (N) may indicate a length of time a pilot tone 210 is communicated on a subcarrier 204 of the sensor network 10 before the pilot tone 210 is shifted to a different subcarrier 204 of the sensor network 10. In one embodiment, the pilot dwell time (N) may comprise a number of OFDM symbols to communicate the pilot tone 210 on each subcarrier 204, such as 1 to 8 OFDM symbols, for example.

The method 1100 may transmit the packet using the multiple subcarriers at block 1106. For example, the transceiver 182 may transmit an OFDM symbol set 202 using the multiple subcarriers 204.

The method 1100 may assign a pilot tone to a first subcarrier of the multiple subcarriers during transmission of the packet at block 1108. For example, the processor 186 may assign a pilot tone 210 to a first subcarrier $204_1$ of the multiple subcarriers during transmission of the OFDM symbol set 202 at a first time instance.

The method 110 may shift the pilot tone from the first subcarrier to a second subcarrier of the multiple subcarriers based on the pilot dwell time during transmission of the packet at block 1110. For example, the processor 186 may cause the transceiver 182 to shift the pilot tone 210 from the first subcarrier $204_1$ to a second subcarrier $204_2$ of the multiple subcarriers 204 based on the pilot dwell time (N) during transmission of the OFDM symbol set 202 at a second time instance, with an amount of time between the first and second time instances determined by N. In one embodiment, the pilot tone shift may occur in a sequential manner. In one embodiment, the pilot tone shift may occur in a random manner.

Figure 12:
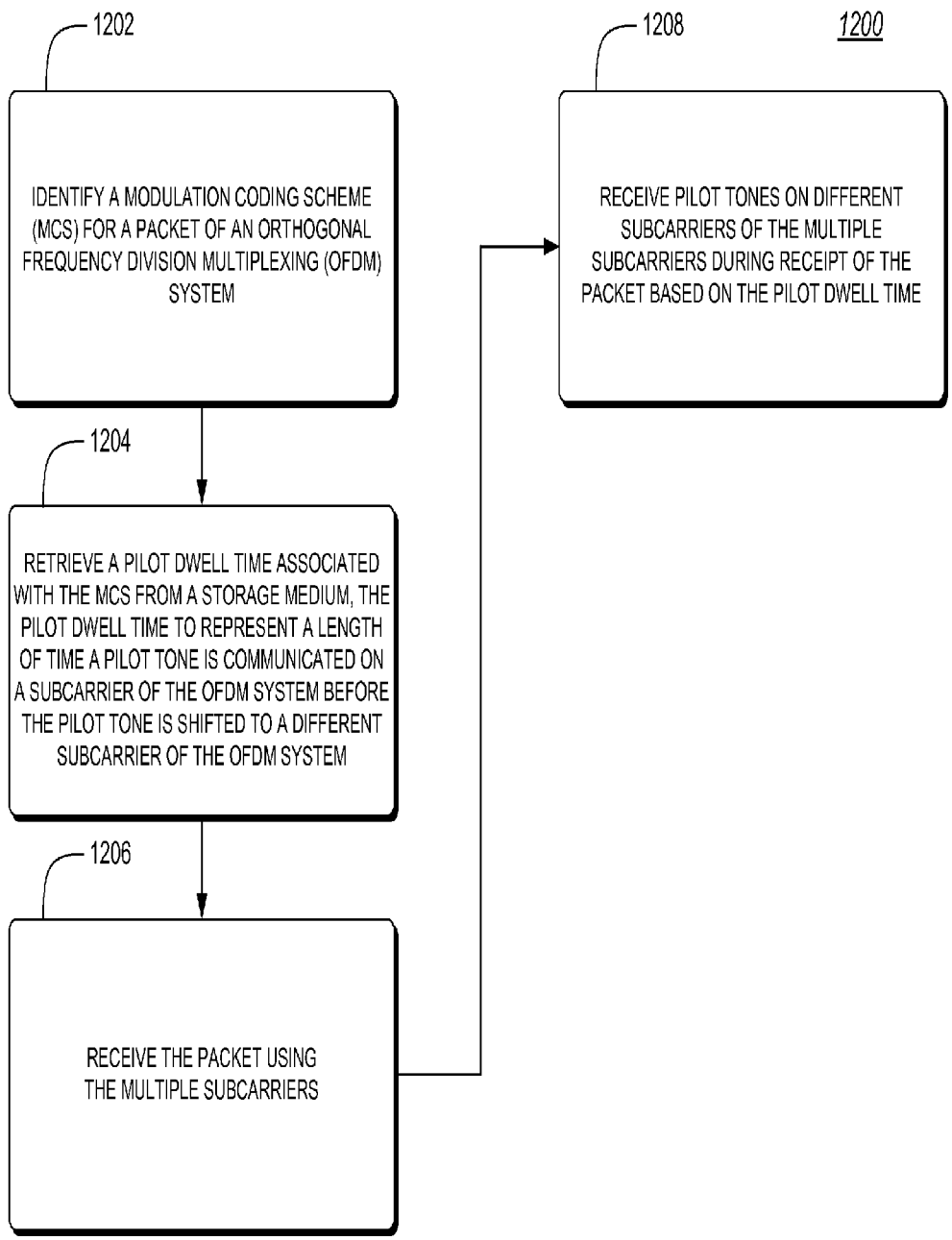
FIG. 12 is a third flowchart of a method for tone allocation in a receiver in accordance with an embodiment.

FIG. 12 is a flowchart of a method 1200 for tone allocation in a receiver in accordance with an embodiment. For instance, the method 1200 may be utilized in various receiving devices (e.g., sensor nodes 40, 50, 106, and/or 133) via the transceiver 182.

As shown in FIG. 12, method 1200 may identify a MCS for a packet of an OFDM system at block 1202. For instance, a sensor node (e.g., sensor nodes 40, 50, 106, and/or 133) may identify a MCS for a packet of an OFDM system through a rate adaptation process.

The method 1100 may retrieve a pilot dwell time associated with the MCS from a storage medium, the pilot dwell time to represent a length of time a pilot tone is communicated on a subcarrier of the OFDM system before the pilot tone is shifted to a different subcarrier of the OFDM system, at block 1204. For instance, the processor 186 may retrieve a pilot dwell time (N) associated with the MCS from the pilot dwell time table 600 stored in RAM 188 or ROM 190. The pilot dwell time (N) may indicate a length of time a pilot tone 210 is communicated on a subcarrier 204 of the sensor network 10 before the pilot tone 210 is shifted to a different subcarrier 204 of the sensor network 10. In one embodiment, the pilot dwell time (N) may comprise a number of OFDM symbols to communicate the pilot tone 210 on each subcarrier 204, such as 1 to 8 OFDM symbols, for example.

The method 1200 may receive the packet using the multiple subcarriers at block 1206. For instance, the transceiver 182 may receive an OFDM symbol set 202 using the multiple subcarriers 204.

The method 1200 may receive pilot tones on different subcarriers of the multiple subcarriers during receipt of the packet based on the pilot dwell time at block 1208. For example, the transceiver 182 may receive pilot tones 210 on different subcarriers $204_1$, $204_2$ of the multiple subcarriers 204 during receipt of the OFDM symbol set 202 at different time instances based on the pilot dwell time (N). Assume a transmitting device utilizes a known MCS and the processor 186 assigns a pilot tone 210 to a first subcarrier $204_1$ of the multiple subcarriers 204 during transmission of the OFDM symbol set 202 at a first time instance for a time period defined by N. For instance, when N=2, the transceiver 182 will transmit the pilot tone 210 on the first subcarrier $204_1$ for a period of 2 symbols. Meanwhile, the processor 186 of the receiving device, having knowledge of the MCS used by the transmitting device, will retrieve a value for N associated with the MCS from the pilot dwell time table 600, and direct the transceiver 182 to monitor the first subcarrier 204$_1$ for the pilot tone 210 for a period of time defined by N. For instance, when N=2, the transceiver 182 will monitor the first subcarrier 204$_1$ to receive the pilot tone 210 for a period of 2 symbols. After 2 symbols, the transmitting device may shift the pilot tone 210 from the first subcarrier 204$_1$ to a second subcarrier 204$_2$ of the multiple subcarriers 204. The processor 186 of the receiving device, having knowledge of N derived through the known MCS used by the transmitting device, will monitor the second subcarrier 204$_2$ to receive the pilot tone 210 for a period of time defined by N, which in this example is 2 symbols. This pilot tone shifting process will continue until the packet is completely transmitted and received by transceiver 182.

Thus, embodiments using different pilot dwell times (N) based on MCS provides some level of optimization without adding undo overhead to the entire system. It adds this optimization without adding two (2) additional SIG field symbols and without needing the devices to exchange information in multiple transmissions which would reduce battery life of the devices.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Various processes to support the establishment of channel estimation and tracking. Using the disclosed approach, efficient and productive use of computing resources in a communication device to track channel changes over time by assigning one or more pilot tones to a packet. Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

What is claimed is:

1. A communication device configured to communicate orthogonal frequency division multiplexing (OFDM) wireless communications, the communication device comprising:
a processor circuit configured to shift positions of first and second pilot tones within a packet having a plurality of symbols, said processor circuit to vary, in a non-sequential manner, the positions of the first and second pilot tones between symbols of the plurality of symbols of the packet, while maintaining a predefined spacing between the first and second pilot tones, wherein a symbol of the plurality of symbols comprises twenty-six data subcarriers denoted (−1) to (−13) and (1) to (13), said processor circuit is to set the first pilot tone to subcarriers within the range of (−1) to (−13), and to set the second pilot tone to subcarriers within the range (1) to (13), said processor circuit to set the first and second pilot tones to a plurality of pairs of subcarriers including at least a pair of subcarriers (−10,4), a pair of subcarriers (−5, 9), and a pair of subcarriers (−13,1); and
a transceiver to transmit an electromagnetic representation of the packet.

2. The communication device of claim 1, wherein the symbol of the plurality of symbols comprises the first and second pilot tones, said data subcarriers, a plurality of guard subcarriers and a Direct Current (DC) subcarrier.

3. The communication device of claim 1, wherein the transceiver is configured to operate according to space time block code (STBC) techniques.

4. The communication device of claim 1, wherein the transceiver is configured to communicate in an Institute of Electrical and Electronics Engineers (IEEE) 802.11ah system wherein the IEEE 802.11ah is related to a low rate communication and sensors networks.

5. A method of communicating orthogonal frequency division multiplexing (OFDM) communications, the method comprising:
shifting positions of first and second pilot tones within a packet having a plurality of symbols, the shifting including varying, in a non-sequential manner, the positions of the first and second pilot tones between symbols of the plurality of symbols of the packet, while maintaining a predefined spacing between the first and second pilot tones, wherein a symbol of the plurality of symbols comprises twenty-six data subcarriers denoted (−1) to (−13) and (1) to (13), the shifting comprising setting the first pilot tone to subcarriers within the range of (−1) to (−13), setting the second pilot tone to subcarriers within the range (1) to (13), and setting the first and second pilot tones to a plurality of pairs of subcarriers including at least a pair of subcarriers (−10,4), a pair of subcarriers (−5, 9), and a pair of subcarriers (−13,1); and
transmitting an electromagnetic representation of the packet.

6. The method of claim 5, wherein the symbol of the plurality of symbols comprises:
the first and second pilot tones, said data subcarriers, a plurality of guard subcarriers, and a Direct Current (DC) subcarrier.

7. The method of claim 5, comprising:
communicating the electromagnetic representation of the packet according to space time block code (STBC) techniques.

8. A computer program product, comprising a non-transitory computer readable storage medium having a computer readable program code embodied therein, the computer readable program code configured to be executed by a communication device to communicate orthogonal frequency division multiplexing (OFDM) communications by:
shifting positions of first and second pilot tones within a packet having a plurality of symbols, the shifting including varying, in a non-sequential manner, the positions of the first and second pilot tones between symbols of the plurality of symbols of the packet, while maintaining a predefined spacing between the first and second pilot tones, wherein a symbol of the plurality of symbols comprises twenty-six data subcarriers denoted (−1) to (−13) and (1) to (13), the shifting comprising setting the first pilot tone to subcarriers within the range of (−1) to (−13), setting the second pilot tone to subcarriers within the range (1) to (13), and setting the first and second pilot tones to a plurality of pairs of subcarriers including at least a pair of subcarriers (−10,4), a pair of subcarriers (−5, 9), and a pair of subcarriers (−13,1); and
transmitting an electromagnetic representation of the packet.

9. The computer program product of claim 8, wherein the symbol of the plurality of symbols comprises:
the first and second pilot tones, said data subcarriers, a plurality of guard subcarriers, and a Direct Current (DC) subcarrier.

10. The computer program product of claim 8, wherein the computer readable program code is configured to cause the communication device to transmit the electromagnetic representation of the packet according to space time block code (STBC) techniques.

11. A communication system configured to communicate orthogonal frequency division multiplexing (OFDM) communications over a sensor network, the system comprising:
a communication device comprising:
one or more antennas;
a processor circuit configured to shift positions of first and second pilot tones within a packet having a plurality of symbols, said processor circuit to vary, in a non-sequential manner, the positions of the first and second pilot tones between symbols of the plurality of symbols of the packet, while maintaining a predefined spacing between the first and second pilot tones, wherein a symbol of the plurality of symbols comprises twenty-six data subcarriers denoted (−1) to (−13) and (1) to (13), said processor circuit is to set the first pilot tone to subcarriers within the range of (−1) to (−13), and to set the second pilot tone to subcarriers within the range (1) to (13), said processor circuit to set the first and second pilot tones to a plurality of pairs of subcarriers including at least a pair of subcarriers (−10,4), a pair of subcarriers (−5, 9), and a pair of subcarriers (−13,1); and
a transceiver to transmit an electromagnetic representation of the packet.

12. The communication system of claim 11, wherein the symbol of the plurality of symbols comprises the first and second pilot tones, said data subcarriers, a plurality of guard subcarriers, and a Direct Current (DC) subcarrier.

13. The communication system of claim 11, wherein the transceiver is configured to operate according to space time block code (STBC) techniques.

14. The communication system of claim 11, wherein the communication device is configured to operate according to an Institute of Electrical and Electronics Engineers (IEEE) 802.11ah standard wherein the IEEE 802.11ah is related to a low rate communication and sensor networks.

15. A communication device configured to communicate orthogonal frequency division multiplexing (OFDM) wireless communications, the communication device comprising:
a transceiver to receive a packet including a plurality of symbols, a symbol of the plurality of symbols includes first and second pilot tones, wherein a position of the first and second pilot tones is shifted, in a non-sequential manner, between symbols of the plurality of symbols of the packet, while maintaining a predefined spacing between the first and second pilot tones, and wherein the symbol comprises twenty-six data subcarriers denoted (−1) to (−13) and (1) to (13), the first pilot tone being set to subcarriers within the range of (−1) to (−13), the second pilot tone being set to subcarriers within the range of (1) to (13), the first and second pilot tones being set to a plurality of pairs of subcarriers including at least a pair of subcarriers (−10,4), a pair of subcarriers (−5, 9), and a pair of subcarriers (−13,1); and
a processor circuit configured to direct the transceiver to monitor the plurality of symbols of the packet for the first and second pilot tones.

16. The communication device of claim 15, wherein the symbol comprises the first and second pilot tones, said data subcarriers, a plurality of guard subcarriers, and a Direct Current (DC) subcarrier.

17. The communication device of claim 15, wherein the transceiver is configured to receive an electromagnetic representation of the packet.

18. The communication device of claim 15, wherein the transceiver is configured to operate according to space time block code (STBC) techniques.

19. The communication device of claim 15, wherein the transceiver is configured to communicate in an Institute of Electrical and Electronics Engineers (IEEE) 802.11ah system, wherein the IEEE 802.11ah is related to a low rate communication and sensor networks.

\* \* \* \* \*